US006903872B2

(12) United States Patent
Schrader

(10) Patent No.: US 6,903,872 B2
(45) Date of Patent: Jun. 7, 2005

(54) ELECTRICALLY RECONFIGURABLE OPTICAL DEVICES

(75) Inventor: Martin Schrader, Tampere (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/476,837

(22) PCT Filed: Apr. 12, 2002

(86) PCT No.: PCT/FI02/00306

§ 371 (c)(1),
(2), (4) Date: Jun. 1, 2004

(87) PCT Pub. No.: WO02/091024

PCT Pub. Date: Nov. 14, 2002

(65) Prior Publication Data

US 2004/0201891 A1 Oct. 14, 2004

(30) Foreign Application Priority Data

May 3, 2001 (FI) .............................. 20010917

(51) Int. Cl.$^7$ ................................ G02B 5/18
(52) U.S. Cl. ..................... 359/572; 359/573; 359/566; 359/291; 359/558
(58) Field of Search ............................... 359/569, 572, 359/571, 566, 573, 291, 290, 297, 558; 348/772, 775

(56) References Cited

U.S. PATENT DOCUMENTS

| 4,626,920 | A | | 12/1986 | Glenn |
| 5,124,834 | A | | 6/1992 | Cusano et al. |
| 5,311,360 | A | | 5/1994 | Bloom et al. |
| 5,526,172 | A | * | 6/1996 | Kanack ..................... 359/291 |
| 5,808,797 | A | * | 9/1998 | Bloom et al. ............... 359/572 |
| 5,867,297 | A | | 2/1999 | Kiang et al. |
| 5,937,115 | A | | 8/1999 | Domash |
| 6,130,770 | A | | 10/2000 | Bloom |
| 6,445,433 | B1 | * | 9/2002 | Levola ....................... 349/113 |
| 6,663,788 | B2 | * | 12/2003 | Kowarz et al. ............... 216/24 |
| 2004/0212869 | A1 | * | 10/2004 | Srinivasan et al. ......... 359/295 |

FOREIGN PATENT DOCUMENTS

| EP | 0 434 139 | 6/1991 |
| GB | 2 237 443 | 5/1991 |

OTHER PUBLICATIONS

Y. P. Guscho, "Physics of Reliofography," Chapter 7, Light Modulator (LM) "Relief", 1992.

* cited by examiner

Primary Examiner—Fayez G. Assaf
(74) Attorney, Agent, or Firm—Alfred A. Fressola; Ware, Fressola, Van Der Sluys, Asolphson

(57) ABSTRACT

The invention refers to electrically reconfigurable optical devices based on the use of a layer of dielectric and transparent viscoelastic material (G) opposing at least a first electrode structure (ES1). According to the invention the arrangement of the individual electrode zones in the first electrode structure (ES1) in order to deform the viscoelastic layer (G) complies with one of the following alternatives. According to the first alternative, the electrode zones of the first electrode structure (ES1) are grouped into groups composed of two or more adjacent electrode zones and within each of said groups individual electrode zones are supplied each with a substantially different voltage. According to the second alternative, the electrode zones of the first electrode structure (ES1) are substantially annular, elliptical, rectangular or polygonal closed-loop electrodes. The invention allows, for example, for creating electrically reconfigurable blazed gratings (30) or Fresnel zone lenses (40).

14 Claims, 5 Drawing Sheets

ELECTRICALLY RECONFIGURABLE OPTICAL DEVICES

CROSS REFERENCE TO RELATED APPLICATIONS

This application is for entry into the U.S. national phase under §371 for International Application No. PCT/FI02/00306 having an international filing date of Apr. 12, 2002, and from which priority is claimed under all applicable sections of Title 35 of the United States Code including, but not limited to, Sections 120, 363 and 365(c), and which in turn claims priority under 35 USC §119 to Finnish Patent Application No. 20010917 filed on May 3, 2001.

TECHNICAL FIELD

The present invention relates to electrically reconfigurable optical devices for diffracting an incident light wave. The invention also relates to a method for forming electrically reconfigurable optical devices for diffracting an incident light wave.

BACKGROUND OF THE INVENTION

Optical signals in different forms are today increasingly utilized in many different types of devices and applications. In order to take full advantage of systems including optical signals or beams, it must be possible to direct the optical signal or beam coming in on a guided optical conduit, or on some other type of optical system in a desired electrically controlled manner to another optical conduit or to another optical system. The aforementioned optical conduit can be, for example, an optical fiber or other type of optical waveguide. On the other hand, the optical signals or beams can be passed through, between or out of optical systems, which systems consist entirely or partly, for example, of more traditional lenses and/or other optical components, which may be separated by air or another optically transparent medium. In between the aforementioned applications there are a wide variety of optical systems, which work under fast changing operational conditions, and thus require the capability to perform optical functions in an efficient and electrically controlled manner.

Especially the recent rapid development of optical telecommunication and optical data processing systems creates increasing needs for versatile electrically reconfigurable optical devices.

In addition to the act of simply switching the optical signal/beam on or off, the term "optical switching" hereinbelow also refers to more complex optical functions, i.e. transformations of the optical signal/beam and/or its path. These include, for example, dividing, redirecting, wavelength filtering or focusing the optical signal/beam in a desired manner. Optical switching can thus be used to modulate a light beam by altering the amplitude, spectrum or phase of the light.

In the following, some prior art solutions for electrically controlled optical switching are shortly discussed. However, such methods, which are based on first converting optical signals into electrical signals for switching and then reconverting said electrical signals back into optical signals for outputting, are not included in the following discussion as they are not relevant to the present invention.

A conventional method for electrically controlled optical switching is to mechanically move the optical components, for example mirrors, beamsplitters or filters in order to affect the propagation of the optical signal/beam. Said mechanical movements can be realized using various kinds of electrical actuators. However, such optical components together with the required electrical actuators cannot be easily made very compact in size and they are also rather difficult and expensive to manufacture, especially as mass-produced articles.

Silicon-surfacemicromachining is a recent technology for fabricating miniature or microscopic devices. This technology has also been used for manufacturing optical microelectromechanical systems (optical MEMS).

U.S. Pat. No. 5,867,297 discloses an oscillatory optical MEMS device including a micromirror for deflecting light in a predetermined manner. Small physical sizes and masses of these micromachined silicon "machine parts" make them more robust and capable of faster operation than conventional macroscopic mechanical devices.

Grating Light Valve™ devices by Silicon Light Machines, USA represent another type of optical MEMS devices. U.S. Pat. No. 5,311,360 discloses a light modulator structure, which consists of parallel rows of reflective ribbons. Alternative rows of ribbons can be pulled down by electrostatic attraction forces a distance corresponding to approximately one-quarter wavelength to create an electrically controlled grating like structure, which can be used to diffractively modulate the incident light wave. The electrical switching of the ribbons can be realized by integrating bottom electrodes below the ribbons, and by applying different voltages to the ribbons and said bottom electrodes to create the required electrostatic forces. U.S. Pat. No. 6,130,770 discloses another type of solution, where instead of using physical electrical connections to charge the predetermined ribbons of the light modulator structure, selected ribbons are electrically charged with an electron gun.

In principle, silicon optical MEMS technology uses processing steps derived from the integrated circuit (IC) fabrication techniques of photolithography, material deposition and chemical etching to produce the movable mechanical structures on a silicon chip. The aforementioned manufacturing process is, however, fairly difficult and thus expensive. Further, the optical MEMS devices operate mainly only in reflection and thus the capability of such devices of more complex transformations of the optical signal/beam and/or its path are limited. Material fatigue may also become significant in certain applications.

Birefringence, also known as double refraction, is a property which can be found in some transparent materials, for example in crystals. Such optical materials have two different indices of refraction in different directions. This can be used to create Pockels effect, an electro-optical effect in which the application of an electric field produces a birefringence which is proportional to the electric field applied to the material. The Pockels effect is well known in the art and it is commonly used to create, for example, fast optical shutters. However, because the use of birefringence requires use of polarized light, this severely limits its use as a general method in realizing optical switching devices.

U.S. Pat. No. 5,937,115 describes switchable optical component structures based on a holographic polymer dispersed liquid crystal. These are electronically controlled Bragg grating structures which allow to electronically switch on and off the diffractive effect of the transparent grating structures, which have been optically recorded or otherwise generated in the material. These electronically switchable Bragg grating (ESBG) devices can be used for various filtering or lensing applications. The major drawback of the ESBG technology is the complex manufacturing process required. Environmental concerns and hazards generally related to liquid crystal materials apply, naturally, also to the ESBG devices.

U.S. Pat. No. 4,626,920 discloses a semiconductor device, which has an array of spaced charge storage electrodes on semiconductor material (Si) and an elastomer layer disposed on said electrodes. At least one conductive and light reflective layer is disposed over the elastomer layer. When voltages are applied between the charge storage electrodes and the conductive layer, this causes the deformation of the conductive/reflective layer and the elastomer layer from a flat surface to a form having a sinusoidally cyclically varying cross-section. Thus, the reflective front surface of the conductive layer can be utilized as an electrically switchable reflective grating.

GB patent 2,237,443 describes another light modulating device, where a reflective elastomer or viscoelastic layer is utilized for light modulation. In this arrangement an electron gun (cathode ray tube) is used instead of direct electrical connections/electrodes (cf. U.S. Pat. No. 4,626,920) to generate the electrical pattern needed to deform the elastomer layer.

An important aspect in the above described type of systems (U.S. Pat. No. 4,626,920 and GB 2,237,443) is the operation of the conductive/reflective layer or layers which is/are mounted on the deformable elastomer layer. Said conductive/reflective layer or layers must reliably and repeatably provide precise patterns of deformations which correspond to the charge pattern modifying the elastomer layer. This, together with the fact that said devices operate only in reflection, limits the use of such devices due to the limited selection of suitable conductive and reflective materials as well as due to the overall response characteristics (sensitivity to the applied voltages/charges, temporal response characteristics) of the device.

Yury P. Guscho "Physics of Reliofography" (Nauka, 1992, 520 p. in Russian) describes in chapter 7 a number of light modulator structures, in which a transparent viscoelastic layer is electrically deformed to manipulate the light passing through said viscoelastic layer. These devices can be taken to present the closest prior art with respect to the current invention, and they are therefore shortly described below with reference to the appended FIGS. 1a and 1b.

FIGS. 1a and 1b correspond to FIG. 7.1 in chapter 7 of "Physics of Reliofography" and show the two basic schemes of the light modulator structures.

In the first scheme in FIG. 1a, the driving signal for deforming the viscoelastic layer G is applied from the free side of the viscoelastic layer G using driving electrodes ES1, which electrodes ES1 are formed on the lower surface of a top glass substrate SM1. A gap is left between the free surface of the viscoelastic layer G and the lower surface of the top glass substrate SM1, allowing the viscoelastic layer G to deform without contacting the opposite structure. The aforementioned gap can be for example air, gas or vacuum. The electric field deforming the viscoelastic layer G is generated between the driving electrodes ES1 and the conductive substrate electrode ES2.

In the second scheme in FIG. 1b, the viscoelastic layer G is disposed on the driving electrode structure ES1, which in turn is formed on a glass substrate SM1. The electric field deforming the viscoelastic layer G is generated by applying alternating voltages to the neighbouring electrode zones in the driving electrode structure ES1.

In both of the aforementioned schemes, the free surface of the viscoelastic layer G can be coated with a conductive reflecting layer (sputtered metal film).

According to our best understanding, all the light modulator structures presented in the chapter 7 of "Physics of Reliofography" and discussed shortly above are based on the basic idea of deforming the viscoelastic layer into a surface structure having a substantially sinusoidally varying cross-section. This structure can be then utilized as an electrically controlled sinusoidal grating in order to modulate the incident light wave. For example, FIGS. 7.1, 7.5 and 7.17 in chapter 7 of "Physics of Reliofography" describe devices in which the driving electrodes are arranged in the form of evenly spaced parallel stripes in order to produce a sinusoidally varying grating structure. FIGS. 7.4 and 7.27 show devices, where certain separate areas of the viscoelastic layer are manipulated with separate electrode structures, which each consist of electrodes arranged in the form of parallel stripes. Thus, in the case of FIGS. 7.4 and 7.27, the different areas within the total area of said viscoelastic layer can be addressed separately in order to form smaller area sinusoidal gratings.

SUMMARY OF THE INVENTION

The main purpose of the present invention is to produce a novel reconfigurable optical device, which is based on the use of electrically deformable viscoelastic layer in order to manipulate the light passing through said viscoelastic layer, but which is not limited to producing only sinusoidally varying grating structures. This innovation allowing to manipulate the viscoelastic layer in completely new ways broadens significantly the possibilities to use electrically controlled viscoelastic materials for optical switching applications.

The basic idea of the invention is to use specific electrode structures and electrode voltages in order to produce strength and/or spatial distribution of the electric field/s that allow to shape the cross-section of the viscoelastic layer beyond simple sinusoidally varying forms. These changes in the cross-sectional shape of the viscoelastic material can be utilized to create a variety of diffractive optical structures to accomplish different optical functions.

In one specific embodiment of the invention, the electrode structure is arranged to form an electrically configurable blazed grating. A blazed grating can be used to diffract substantially all of the incident light in one direction or to one target (diffraction order) at a time, which provides the possibility to accomplish optical switching without significant loss of light. Thus, in this respect, the performance of a blazed grating is superior compared to a sinusoidal grating, which diffracts light intrinsically simultaneously at least in two different diffraction orders (directions).

In another embodiment of the invention, the electrode structure is arranged to form a switchable Fresnel zone lens. A Fresnel zone lens can be used for example to focus an incident light beam into a single focal point, or to collimate an incident light beam. A Fresnel zone lens according to the invention can be utilized as an electrically reconfigurable lens.

The devices according to the invention are significantly more advantageous than prior art devices in providing much wider possibilities to manufacture diffractive, electrically reconfigurable optical devices. The manufacture of such devices also promises to be relatively easy and economical compared to prior art technologies allowing, for example, the use of a wider variety of substrate materials and simpler manufacturing processes. The manufacture of the devices according to invention does not involve for example the use of environmentally harmful liquid crystal materials or require deep etching. Further, the optical devices according to the invention are independent of polarization.

The preferred embodiments of the invention and their benefits will become more apparent to a person skilled in the art through the description and examples given hereinbelow, and also through the appended claims.

BRIEF DESCRIPTION OF THE DRAWINGS

In the following, the invention will be described in more detail with reference to the appended drawings, in which.

DETAILED DESCRIPTION

Figure 1B:
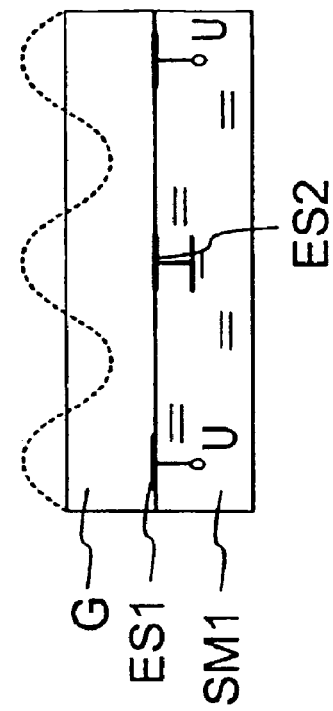
FIGS. 1a,1b illustrate prior art light modulator structures utilizing electrically controlled transparent viscoelastic layer to produce sinusoidally varying gratings.
Figure 1A:
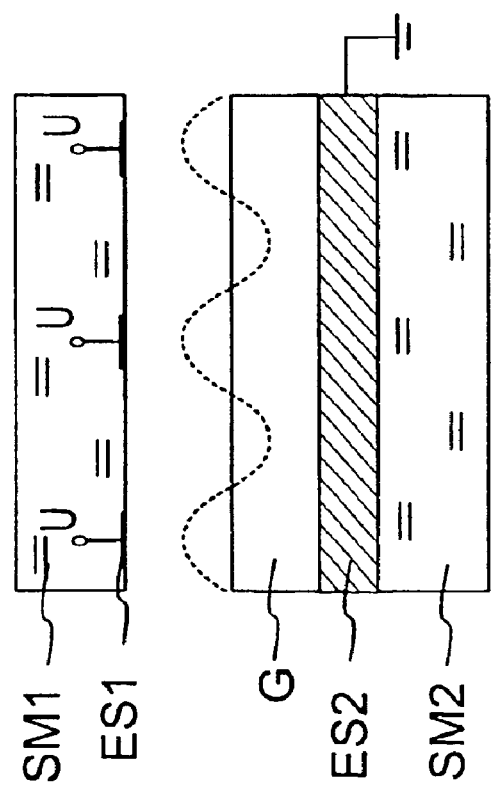

It is to be understood that the drawings presented hereinbelow are designed solely for purposes of illustration and thus, for example, not for showing the various components of the devices in their correct relative scale and/or shape. For the sake of clarity, the components and details which are not essential in order to explain the spirit of the invention have also been omitted in the drawings.

Figure 2:
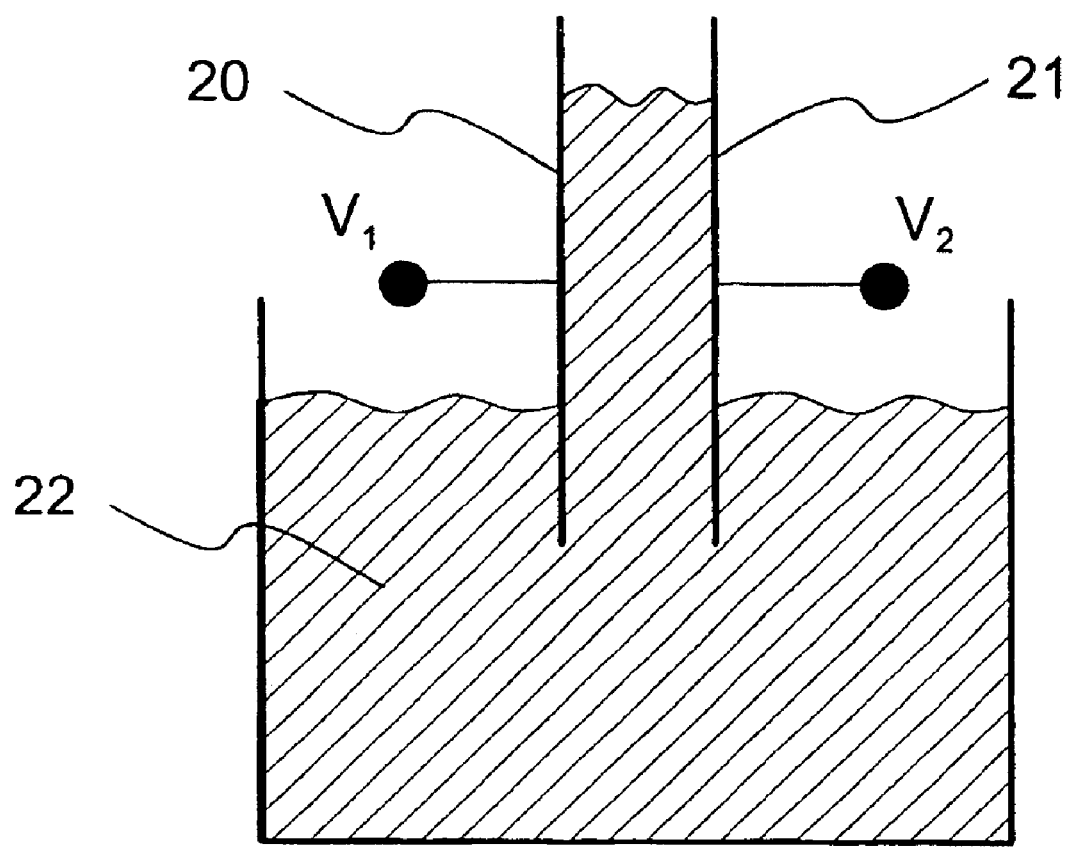
FIG. 2 illustrates the behaviour of dielectric liquid in an electric field between electrode plates of a field capacitor, FIG. 3a/b illustrate schematically a reconfigurable blazed grating according to the invention.

FIG. 2 illustrates the general principle of physics, which can be observed with dielectric substances. A dielectric substance can be defined as a substance in which an electric field may be maintained with zero or near zero power dissipation, i.e. the electrical conductivity is zero or near zero. In an electric field, the surface of two dielectrics with different dielectric constants is known to experience a force which is proportional to the square of the electric field strength. In FIG. 2 where an electric field is formed between electrode plates 20 and 21 of a field capacitor by applying suitable voltages $V_1$ and $V_2$ on said electrodes, dielectric liquid 22 is drawn between the electrode plates because of the aforementioned force effect.

Hereinbelow, some specific examples of different types of optical switching devices incorporating the electrically controlled viscoelastic layer are presented. It should be understood that these examples should not be interpreted as a definition of the limits of the invention, but they are merely intended to clarify the spirit of the invention.

Various other diffractive optical structures can be realized according to the invention and within the limits of the appended claims.

Reconfigurable Blazed Grating

Figure 3A:
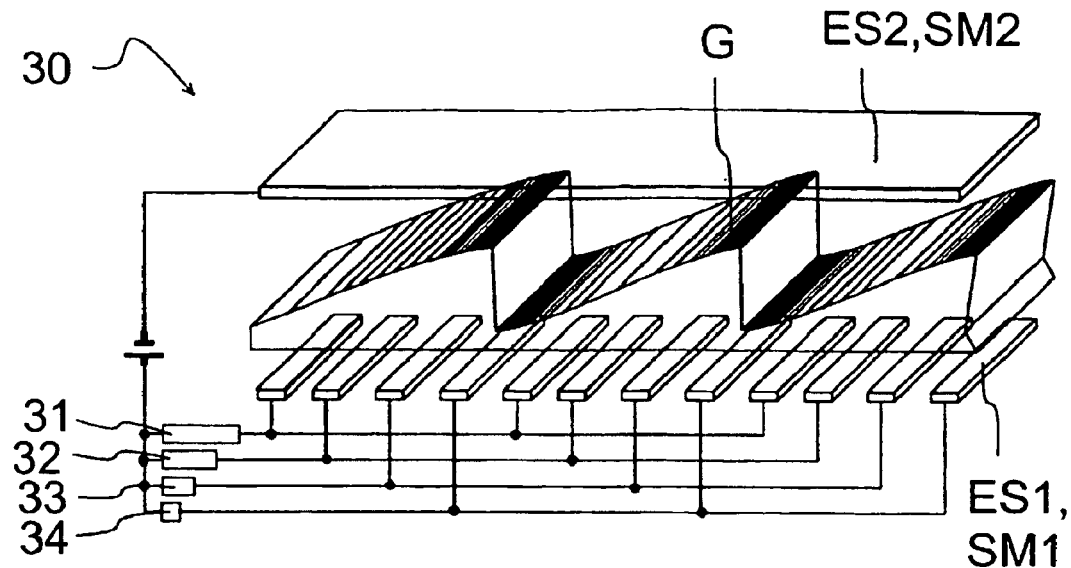
Figure 3B:
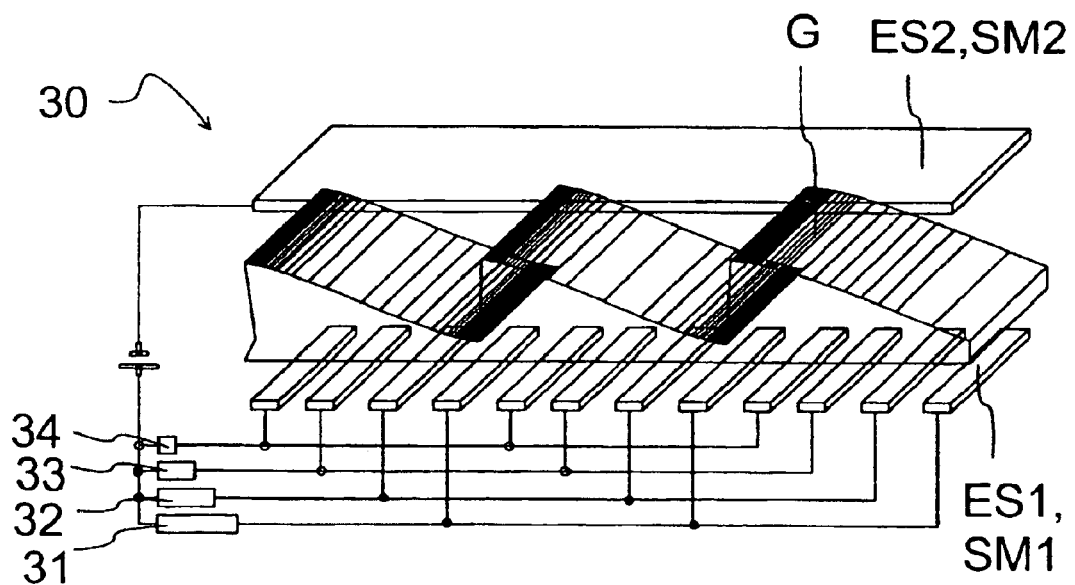

FIGS. 3a and 3b illustrate the use of the electrically controlled transparent viscoelastic layer G to create a reconfigurable blazed grating 30.

It is generally known in the art that blazed diffraction gratings are capable of directing the light mainly in only one diffraction order instead of spreading the available light energy out over a number of lower-irradiance diffraction orders. Thus, a blazed grating can provide a significantly higher light throughput than other types of diffraction gratings.

Since the force on the dielectric material located in an electric field depends on the square of the electrical field, it is possible to deform the viscoelastic layer G into a desired structure by using an array of densely packed electrode zones and by applying appropriate voltages in said electrode zones.

In FIGS. 3a and 3b, the first electrode structure ES1 (driving electrodes) consists of electrode zones arranged as substantially parallel adjacent stripes. Said electrode zones are further divided into groups of four adjacent zones, which zones are supplied from the common voltage source through voltage-dropping means 31–34. Within each of said groups, the individual electrode zones are therefore supplied each with a substantially different voltage.

In FIGS. 3a and 3b, the second electrode structure ES2 consists of a single electrode zone. For the sake of clarity, the substrate materials SM1,SM2 supporting the first and second electrode structures ES1,ES2 are not shown in FIGS. 3a and 3b.

By varying the voltage upon the electrode zones of the first electrode structure ES1 in a manner which corresponds to the act of moving from the situation illustrated in FIG. 3a to that of FIG. 3b, the direction of the so-called blaze angle of the viscoelastic grating can be changed and a different diffraction order (direction) can be selected.

When light diffracted to said different orders (and directions) is arranged to hit different targets, the incident light can be directed to one of said targets without splitting the light between multiple targets. Thus, the switchable blazed grating 30 can be used to pass substantially all the incident light through without deviation, or alternatively to direct substantially all the light into one of several targets.

By selecting the number and magnitude (potential) of the different voltage levels and the way they are applied to the individual electrode zones of the first electrode structure ES1, the blaze angle and/or the grating constant of the viscoelastic grating can be electrically reconfigured.

Reconfigurable Fresnel Zone Lens

Figure 4:
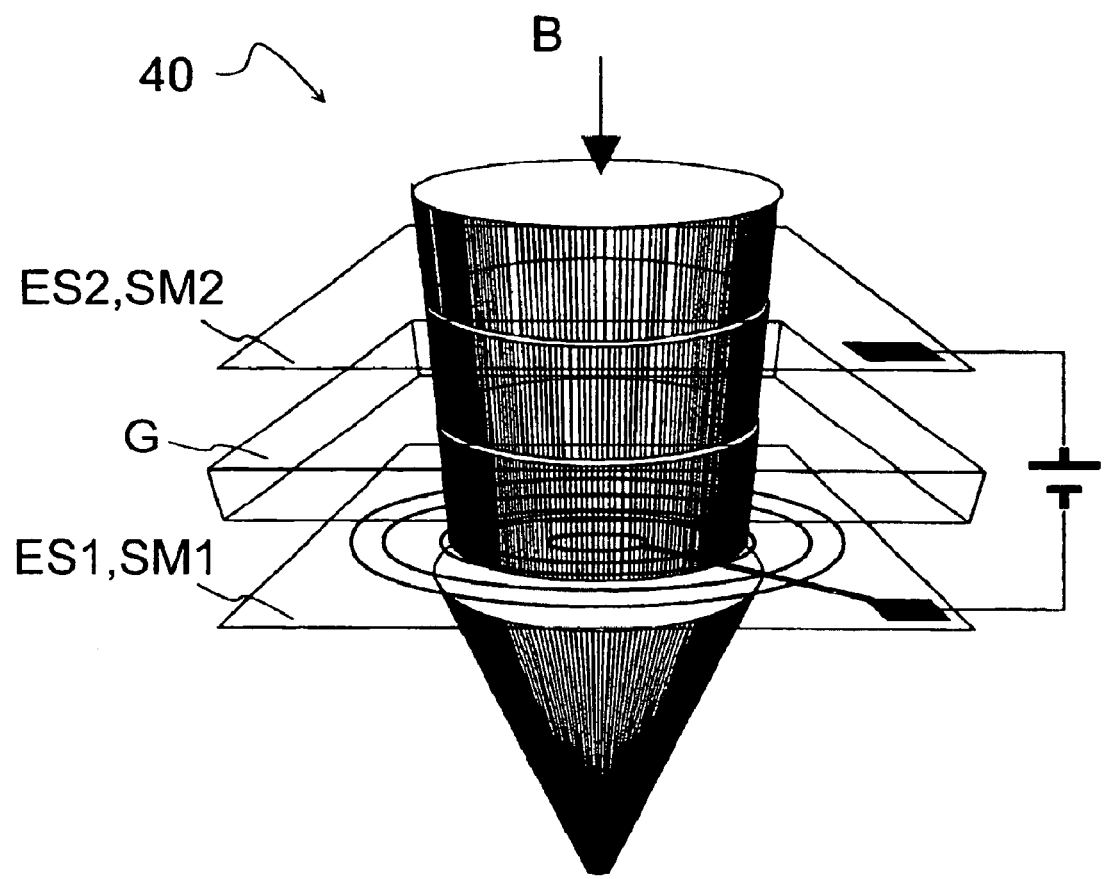
FIG. 4 illustrates schematically a reconfigurable Fresnel zone lens according to the invention.

FIG. 4 illustrates the use of the electrically controlled transparent viscoelastic layer G to create a reconfigurable Fresnel zone lens 40. A Fresnel zone lens (FZL) is a diffractive optical element capable of focusing light by diffracting light from annular concentric zones so that the diffracted light interferes constructively in the focus. As is well-known in the art, said concentric zones obey the relation:

$$\sqrt{\rho_m^2 + f^2} - f = m\lambda \qquad (1)$$

in which m=number of concentric zones $\rho_m$=radii of zone m $\lambda$=wavelength of the incident light f=principal focal length In addition to having a single focus at distance of f, the FZL has other focus points at f/3, f/5, f/7 . . . , which correspond to different diffraction orders. The manner in which the light energy is divided among the different diffraction orders can be affected by the properties of the concentric zones.

In FIG. 4, the first electrode structure ES1 (driving electrodes) consists of annular and concentric electrode zones with their number and radii arranged according the aforementioned equation (1). The second electrode structure ES2 consists of a single electrode zone. For the sake of clarity, the first and second substrate materials SM1,SM2 supporting the first and second electrode structures ES1,ES2 are not shown in FIG. 4.

When a voltage between the first electrode structure ES1 and the second electrode structure ES2 is switched on and off, the Fresnel zone lens 40 is switched between two states: When the voltage is switched off, the collimated light beam B incident on the device passes through the Fresnel zone lens 40 without being substantially affected. When the voltage is switched on, the viscoelastic material G is deformed into a Fresnel lens which causes the incident light beam B to be focused into one or more focal points. By arranging the Fresnel zones in a suitable manner, the Fresnel zone lens 40 can be arranged to have a desired focal length.

The Fresnel zone lens 40 can be realized as a transparent structure as illustrated in FIG. 4, or it can also be realized as a reflective structure arranging the first ES1 or the second ES2 electrode structure/s, and/or substrate materials SM1, SM2 supporting said electrode structures to be reflective.

The neighbouring concentric electrode zones in the first electrode structure ES1 can be supplied all with a substantially same voltage as indicated in FIG. 4, but it is also possible to supply some or each of the concentric electrode zones in the first electrode structure ES1 with individually differing voltages.

Further, it is also possible to apply alternating voltages to neighbouring electrode zones in the first electrode structure ES1, which eliminates the need for a separate second electrode structure ES2

Instead of consisting of annular and concentric electrode zones, the electrode structures may also consist of elliptical, rectangular or polygonal shaped closed-loop electrodes, which are arranged concentrically within each other according to their diameter.

While the invention has been shown and described above with respect to selected types of optical switching devices, it should be understood that these devices are only examples and that a person skilled in the art could construct other optical diffractive switching devices utilizing techniques other than those specifically disclosed herein while still remaining within the spirit and scope of the present invention. It should therefore be understood that various omissions and substitutions and changes in the form and detail of the switching devices illustrated, as well as in the operation of the same, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to restrict the invention only in the manner indicated by the scope of the claims appended hereto.

Figures 5A, 5B:
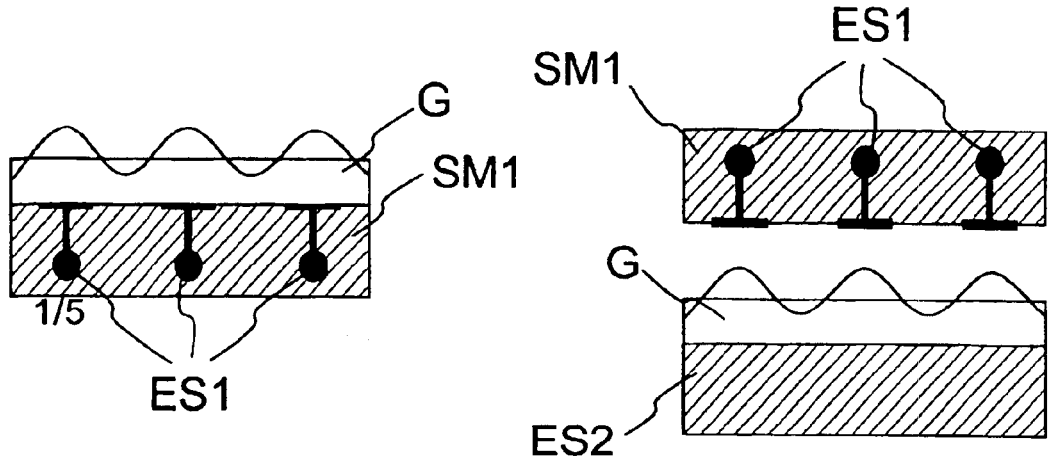
FIG. 5a illustrates schematically an embodiment of the invention where the viscoelastic layer is arranged on the top of the first driving electrode structure.
FIG. 5b illustrates schematically an embodiment of the invention where the viscoelastic layer is arranged opposing the first driving electrode structure.

For example, the layer of the dielectric and transparent viscoelastic material G may be arranged directly on the top of the first driving electrode structure ES1, or opposing said first electrode structure ES1. Such embodiments of the invention are illustrated schematically in FIGS. 5a and 5b, respectively.

Figures 5C, 5D:
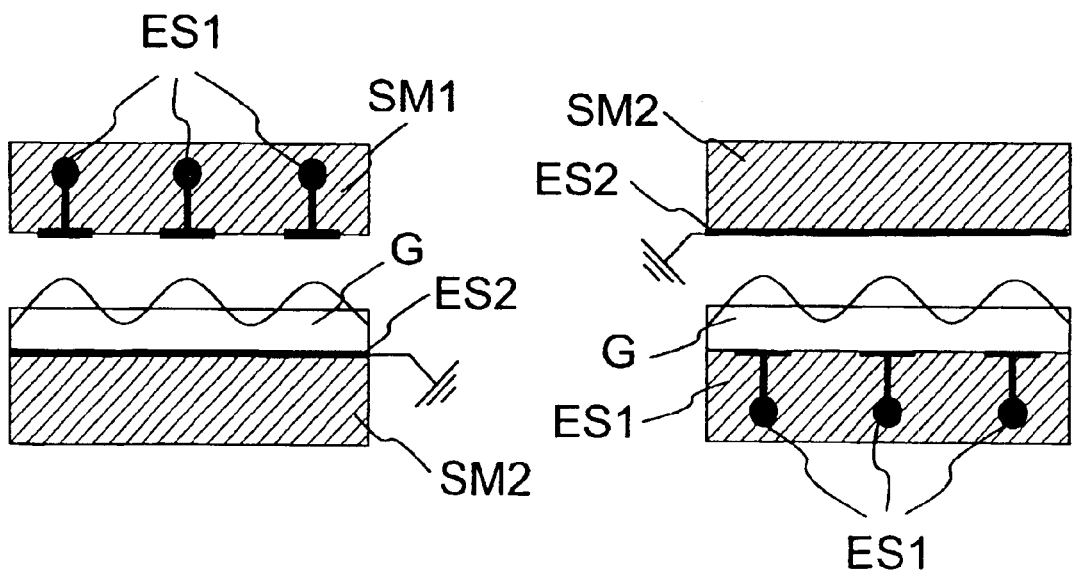
FIG. 5c illustrates schematically an embodiment of the invention where the viscoelastic layer is sandwiched between the first and second electrode structures and arranged opposing the first driving electrode structure.
FIG. 5d illustrates schematically an embodiment of the invention where the viscoelastic layer is sandwiched between the first and second electrode structures and arranged on the top of the first driving electrode structure.

Depending on the application, optionally, a second electrode structure ES2 may be located opposing the first electrode structure ES1 so that the electric field generated between the first ES1 and second ES2 electrode structures passes through the layer of the viscoelastic material G. In such embodiments of the invention, the viscoelastic layer G becomes sandwiched between the first ES1 and second ES2 electrode structures as shown schematically in FIGS. 5c and 5d.

The use of a second electrode structure ES2 allows to manipulate the viscoelastic layer G at reduced voltage levels relative to the voltages required for operation utilizing only the first electrode layer ES1. The second electrode structure ES2 also increases the degree of freedom in generating a specified electric field and corresponding cross-sectional shape of the viscoelastic layer.

However, the use of a separate second electrode structure ES2 is not necessary if the neighbouring electrode zones in the first driving electrode structure ES1 are provided with suitable (favourably alternating) voltages so that electric fields are generated in between the neighbouring electrode zones.

The number of the separate electrode zones in the first electrode structure ES1 or in the second electrode structure ES2 is arbitrary, and the number can therefore be increased or decreased depending on the particular optical switching application. The number of the electrode zones in each group formed within the first driving electrode structure ES1 is also arbitrary and can also vary between said groups.

It is also obvious for a person skilled in the art that the operation of the optical devices according to the invention relies on some applications on optical interference, and thus requires a certain degree of coherence and/or collimation of the optical signal/beam that is being processed.

By reversing the direction of propagation of light, the operation of the optical devices changes accordingly, for example, instead of focusing the light it becomes collimated.

The suitable transparent viscoelastic material G includes, for example, silicone gel, oil, various polymer materials or other viscous substances that have a tendency to deform when placed in a presence of an electric field, and said materials relax towards their original form or shape after the aforementioned effect ceases.

The transparent electrode structure ES1 and/or ES2 is preferably made of indium tin oxide (ITO), as is known in the art, and the transparent substrates SM1,SM2 necessary to support said electrode structures are preferably made of glass. Other methods for creating substantially transparent electrode structures on any substantially transparent substrate material can also be employed without departing from the scope of the present invention. Instead of being fully transparent, it is also obvious that the substrate materials and/or electrode structures on either side of the viscoelastic layer G may be arranged to be fully or partly reflecting and/or providing spectral filtering of the transmitted and/or reflected light. It is also obvious that the free surface of the viscoelastic layer G can be coated with a reflecting layer, for example with a metallic film applied by sputtering techniques.

What is claimed is:

1. An optical reconfigurable device for diffracting an incident light wave (B) comprising at least a first transparent driving electrode structure (ES1) consisting of several electrode zones arranged in a manner that said electrode zones are capable of receiving voltages for generating electric field or fields, a layer of dielectric and transparent viscoelastic material (G) arranged on the top or opposing said first electrode structure (ES1) and capable of being deformed in local thickness in response to said electric field/s, so that when incident light wave (B) passes through said viscoelastic material (G), the light wave (B) experiences diffraction according to local variations in the thickness of the layer of said viscoelastic material (G), characterized in that the arrangement of the individual electrode zones in said first electrode structure (ES1) complies with one of the following alternatives:

said electrode zones of said first electrode structure (ES1) are grouped into groups composed of two or more adjacent electrode zones, and within each of said groups, individual electrode zones are supplied each with a substantially different voltage, or said electrode zones of said first electrode structure (ES1) are substantially annular, elliptical, rectangular or polygonal closed-loop electrodes arranged within each other according to their diameter, and said closed-loop electrode zones are supplied all with a substantially same voltage, or some or each of said electrode zones are supplied with individually different voltages.

2. The device according to claim 1, characterized in that said device also comprises a second transparent electrode structure (ES2) consisting of one or more separate electrode zones arranged in a manner that said electrode zones are capable of receiving voltages for generating an electric field or fields in a manner that said electric field/s passes through said viscoelastic material (G) from said second electrode structure (ES2) to said first electrode structure (ES1).

3. The device according to claim 2, characterized in that said first electrode structure (ES1) consists of electrode zones in the form of parallel stripes, said electrode zones of said first electrode structure (ES1) are grouped into groups composed of several adjacent zones, said adjacent zones in said groups are supplied each with a different voltage supplied from a common source through voltage-dropping means (61,62,63,64), and said second electrode structure (ES2) consists of a single electrode zone connected to a voltage having substantially opposite polarity than the voltages connected to said first electrode structure (ES1), so that said viscoelastic layer (G) can be deformed to a form having a surface cross-section to realize an electrically reconfigurable blazed grating (30).

4. The device according to claim 2, characterized in that said first electrode structure (ES1) consists of electrode zones in the form of annular and concentric closed-loop electrodes connected to a common voltage, and said second electrode structure (ES2) consists of a single electrode zone connected to a voltage having substantially opposite polarity than voltages connected to said first electrode structure (ES1), so that said viscoelastic layer (G) can be deformed to a form having a surface cross-section to realize an electrically reconfigurable Fresnel zone lens (40).

5. The device according to claim 1, characterized in that said first (ES1) and/or said second (ES2) electrode structure/s, and/or substrate materials (SM1,SM2) supporting said electrode structures is/are arranged to be light reflecting.

6. The device according to claim 1, characterized in that the substrate material (SM1) supporting said first electrode structure (ES1) and/or the substrate material (SM2) supporting said second electrode structure (ES2) is/are arranged to provide spectral filtering of the light wave (B).

7. The device according to claim 1, characterized in that said first (ES1) and/or second (ES2) electrode structure/s is/are indium tin oxide (ITO) structure/s.

8. A method for forming a reconfigurable optical device for diffracting an incident light wave (B) comprising at least the steps of forming a first transparent driving electrode structure (ES1) consisting of several electrode zones arranged in a manner that said electrode zones are capable of receiving voltages for generating electric field or fields;

forming a layer of dielectric and transparent viscoelastic material (G) on the top or opposing said first electrode structure (ES1) and capable of being deformed in local thickness in response to said electric field/s, so that when the incident light wave (B) passes through said viscoelastic material (G), the light wave (B) experiences diffraction according to the local variations in the thickness of the layer of said viscoelastic material (G), characterized in that the individual electrode zones in said first electrode structure (ES1) are arranged to comply with one of the following alternatives:

said electrode zones of said first electrode structure (ES1) are grouped into groups composed of two or more adjacent electrode zones, and within each of said groups, individual electrode zones are supplied each with a substantially different voltage, or said electrode zones of said first electrode structure (ES1) are substantially annular, elliptical, rectangular or polygonal closed-loop electrodes arranged within each other according to their diameter, and said closed-loop electrode zones are supplied all with a substantially same voltage, or some or each of said electrode zones are supplied with individually different voltages.

9. The method according to claim 8, characterized in that said method also comprises a step of forming a second transparent electrode structure (ES2) consisting of one or more separate electrode zones arranged in a manner that said electrode zones are capable of receiving voltages for generating an electric field or fields in a manner that said electric field/s pass through said viscoelastic material (G) from said second electrode structure (ES2) to said first electrode structure (ES1).

10. The method according to claim 9, characterized in that said first electrode structure (ES1) consists of electrode zones in the form of parallel stripes, said electrode zones of said first electrode structure (ES1) are grouped into groups composed of several adjacent zones, said adjacent zones in said groups are supplied each with a different voltage supplied from a common source through voltage-dropping means (61,62,63,64), and said second electrode structure (ES2) consists of a single electrode zone connected to a voltage having substantially opposite polarity than the voltages connected to said first electrode structure (ES1), so that said viscoelastic layer (G) can be deformed to a form having a surface cross-section to realize an electrically reconfigurable blazed grating (30).

11. The method according to claim 9, characterized in that said first electrode structure (ES1) consists of electrode zones in the form of annular and concentric electrodes connected to a common voltage, and said second electrode structure (ES2) consists of a single electrode zone connected to a voltage having substantially opposite polarity than the voltages connected to said first electrode structure (ES1), so that
said viscoelastic layer (G) can be deformed to a form having a surface cross-section to realize an electrically reconfigurable Fresnel zone lens (40).

12. The method according to claim 8, characterized in that said first (ES1) and/or said second (ES2) electrode structure/s, and/or substrate materials (SM1,SM2) supporting said electrode structures is/are arranged to be light reflecting.

13. The method according to claim 8, characterized in that the substrate material (SM1) supporting said first electrode structure (ES1) and/or the substrate material (SM2) supporting said second electrode structure (ES1) is/are arranged to provide spectral filtering of the light wave (B).

14. The method according to claim 8, characterized in that said first (ES1) and/or second (ES2) electrode structure/s is/are formed as indium tin oxide (ITO) structure/s.

* * * * *